United States Patent
Chang et al.

(10) Patent No.: US 8,156,032 B2
(45) Date of Patent: Apr. 10, 2012

(54) AUCTION-PRICING MANY SUBSTITUTE PRODUCTS

(75) Inventors: Chi-Chao Chang, Santa Clara, CA (US); Sai-Ming (Eliot) Li, Santa Clara, CA (US); Randolph Preston McAfee, San Marino, CA (US); Darshan Kantak, Pasadena, CA (US)

(73) Assignee: Yahoo! Inc., Sunnyvale, CA (US)

( * ) Notice: Subject to any disclaimer, the term of this patent is extended or adjusted under 35 U.S.C. 154(b) by 474 days.

(21) Appl. No.: 11/933,127

(22) Filed: Oct. 31, 2007

(65) Prior Publication Data

US 2009/0112653 A1 Apr. 30, 2009

(51) Int. Cl.
*G06Q 40/00* (2012.01)
(52) U.S. Cl. .......................................... 705/37
(58) Field of Classification Search ............... 705/37, 705/14.69, 14.71, 26, 14
See application file for complete search history.

(56) References Cited

U.S. PATENT DOCUMENTS

| 6,327,574 B1* | 12/2001 | Kramer et al. | 705/14.66 |
| 2008/0052343 A1* | 2/2008 | Wood | 709/202 |
| 2008/0082397 A1* | 4/2008 | Dennison et al. | 705/10 |

OTHER PUBLICATIONS

CPX Interactive Joins DoubClick Advertising Exchange. PR Newswire. Oct. 30, 2007.*
Cox Digital Solutions and Gourmet Ads to Launch Ad Exchange. Entertainment Close-up. Nov. 15, 2011.*
Traffiq launches online advertising exchange. Business Wire. Aug. 21, 2007.*

* cited by examiner

*Primary Examiner* — Olabode Akintola
*Assistant Examiner* — John Preston
(74) *Attorney, Agent, or Firm* — Stattler-Suh PC

(57) ABSTRACT

A method of providing advertising services selects a finite set of topics, and arranges the selected set of topics into a hierarchical structure. The method classifies impression items into the nodes within the hierarchical structure, and allows bidding against the nodes within the hierarchical structure. Some embodiments allow a bidder to request a refinement of the hierarchical structure. These embodiments receive such a request, and compare the request to a set of criteria. If the request meets the set of criteria, the method divides a first node in the hierarchical structure to at least a second and third node. The method allows bidders to bid on each of the first, second, and third nodes. The method optionally measures a performance for the nodes within the hierarchical structure. Based on the measure of performance for the nodes, the method preferably removes an under-performing node from the hierarchical structure.

8 Claims, 12 Drawing Sheets

AUCTION-PRICING MANY SUBSTITUTE PRODUCTS

FIELD OF THE INVENTION

The present invention is related to the field of advertising, and is more specifically directed to pricing substitutes by using auctions.

BACKGROUND

The Internet provides a mechanism for merchants to offer a vast amount of products and services to consumers. Internet portals provide users an entrance and guide into the vast resources of the Internet. Typically, an Internet portal provides a range of search, email, news, shopping, chat, maps, finance, entertainment, and other Internet services and content. Yahoo, the assignee of the present invention, is an example of such an Internet portal.

When a user visits certain locations on the Internet (e.g., web sites), including an Internet portal, a system can capture the user's online activity. This information may be recorded and analyzed to determine patterns and interests of the user. In turn, these patterns and interests may be used to target the user to provide a more meaningful and rich experience. For example, if interests in certain products and services of the user are determined, content and advertisements, pertaining to those products and services, may be served to the user. Advertisements are usually provided by advertisers or marketers, who research and develop campaigns for the market. Content is typically provided by a network of publishers, often in conjunction with a portal provider. A system that serves well targeted advertisements benefits both the advertiser/marketer, who provides a message to a target audience, and a user who receives advertisements in areas of interest to the user. Similarly, publishers and portals are benefited by increased relevance and/or traffic.

Currently, advertising through computer networks such as the Internet is widely used along with advertising through other mediums, such as television, radio, or print. In particular, online advertising through the Internet provides a mechanism for merchants to offer advertisements for a vast amount of products and services to online users. In terms of marketing strategy, different online advertisements have different objectives depending on the user toward whom an advertisement is targeted.

Often, an advertiser will carry out an advertising campaign where a series of one or more advertisements are continually distributed over the Internet over a predetermined period of time. Advertisements in an advertising campaign are typically branding advertisements but may also include direct response or purchasing advertisements.

SUMMARY

Embodiments of the invention allow advertisers to generate finer distinctions in the distribution and/or targeting of advertising toward user audiences. Moreover, as target audiences are refined, some embodiments address the additional complexity by scaling automatically. Particular embodiments employ content match to target, based on a context within the distribution media, and/or employ additional targeting based on the audience and/or users. Such user-based targeting includes, for example, demographic and/or geographic data. An exemplary implementation generates an auction type marketplace where advertisers bid on advertising products and/or services. Competition among advertisers determines price. Further, pricing such as price premiums limit inefficient marketplace activities such as the generation of undesirable and/or excessively narrow advertising and/or targeting products.

Accordingly, a method of providing advertising services selects a finite set of topics, and arranges the selected set of topics into a hierarchical structure. The method classifies impression items into the nodes within the hierarchical structure, and allows bidding against the nodes within the hierarchical structure. Some embodiments allow a bidder to request a refinement of the hierarchical structure. These embodiments receive such a request, and compare the request to a set of criteria. If the request meets the set of criteria, then based on the request, the method divides a first node in the hierarchical structure to at least a second and third node. The method allows bidders to bid on each of the first, second, and third nodes. Preferably, the method receives several bids for one or more of the nodes within the hierarchical structure, and calculates an equilibrium price for each node. The bids are for purchasing the right to present content in relation to a node. The method optionally measures a performance for the nodes within the hierarchical structure. Based on the measure of performance for the nodes, the method preferably removes an under-performing node from the hierarchical structure. Generation and/or maintenance of an under-performing node may, for instance, undesirably lower the price of one or more nodes in the hierarchical structure. Additional embodiments include a system and/or a computer readable medium for performing the foregoing.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

Advertisers generally prefer more specialized products and, services. More specifically, advertisers may request finer granularity products, for instance, to target 30-45 year old college-educated males with an interest in lawn tractors. This example represents fine grained targeting by using both demographic and behavioral type data. In the highly competitive field of advertising and/or targeting, offering such finely tuned products is essential to meet the demands of the industry.

However, for a provider of targeting services such as an Internet portal, for example, very fine targeting undesirably causes lack of liquidity, reduced competition, and lower prices for the advertising and/or targeting products offered. Moreover, current content match technology does not scale well as audiences are refined (i.e., are too finely segmented). Hence, a targeting mechanism that relies on market forces to advantageously define and/or optimize product offerings and/or pricing is disclosed herein.

Accordingly, some embodiments of the invention include an auction-based non-guaranteed marketplace system that is based on a content topic taxonomy. By using the marketplace system, advertisers advantageously have the ability to customize advertising and/or targeting products to meet their individual needs. Some embodiments provide a default set of advertising products that include content match topics in conjunction with audience and/or user targeting, for example. These default marketplace products are available for further refinement by the advertisers. As mentioned above, generating increasingly fine sub-categories is expensive for the supplier of advertising and/or targeting services. Hence, some embodiments limit the proliferation of advertising products by applying a price premium that is generated by the auction system while, in contrast, refinement and/or expansion of advertising products that result in a healthy marketplace system, are retained.

Marketplace Generation

Figure 1:
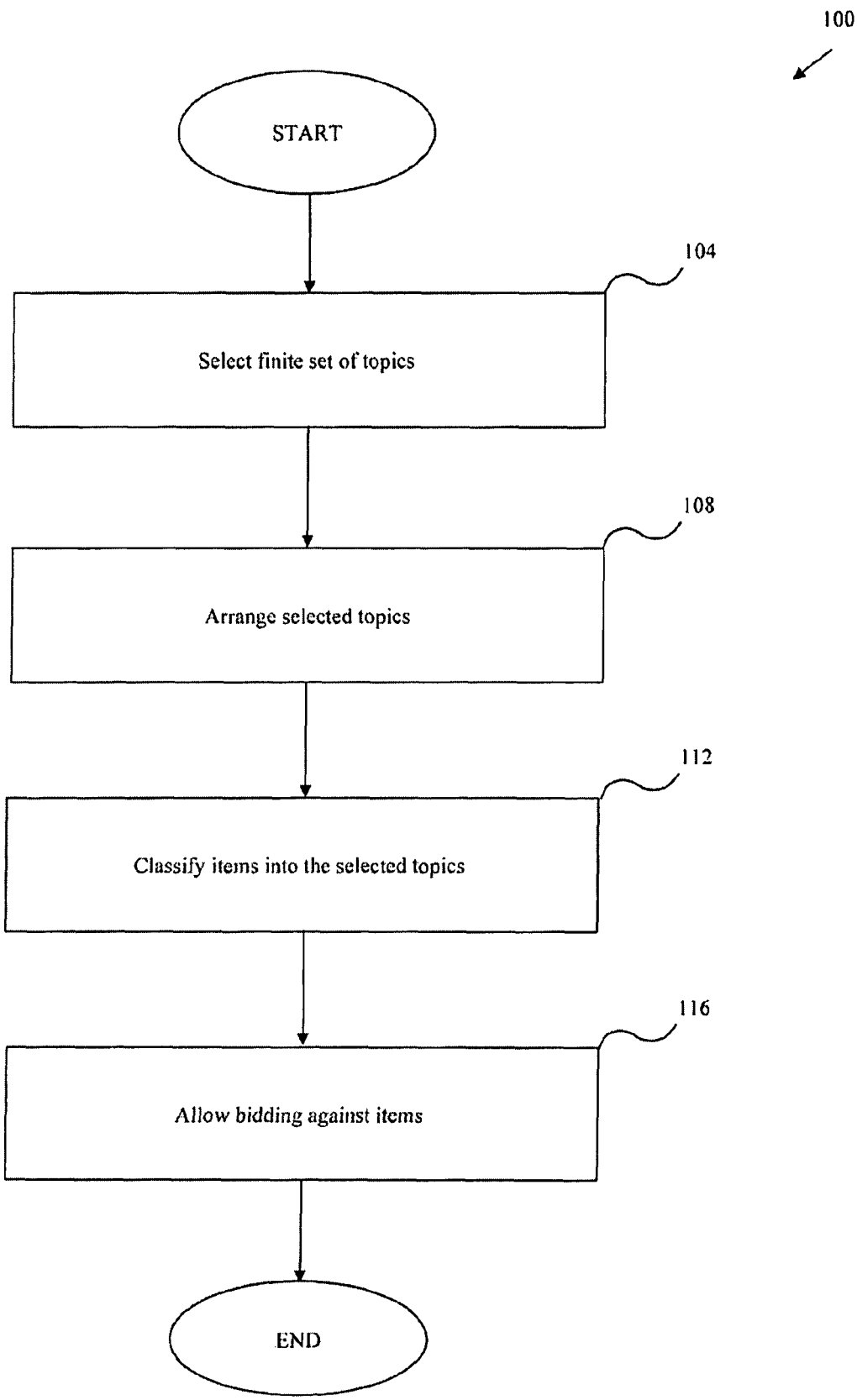
FIG. 1 illustrates a process for providing advertising and/or targeting services.
Figure 3:
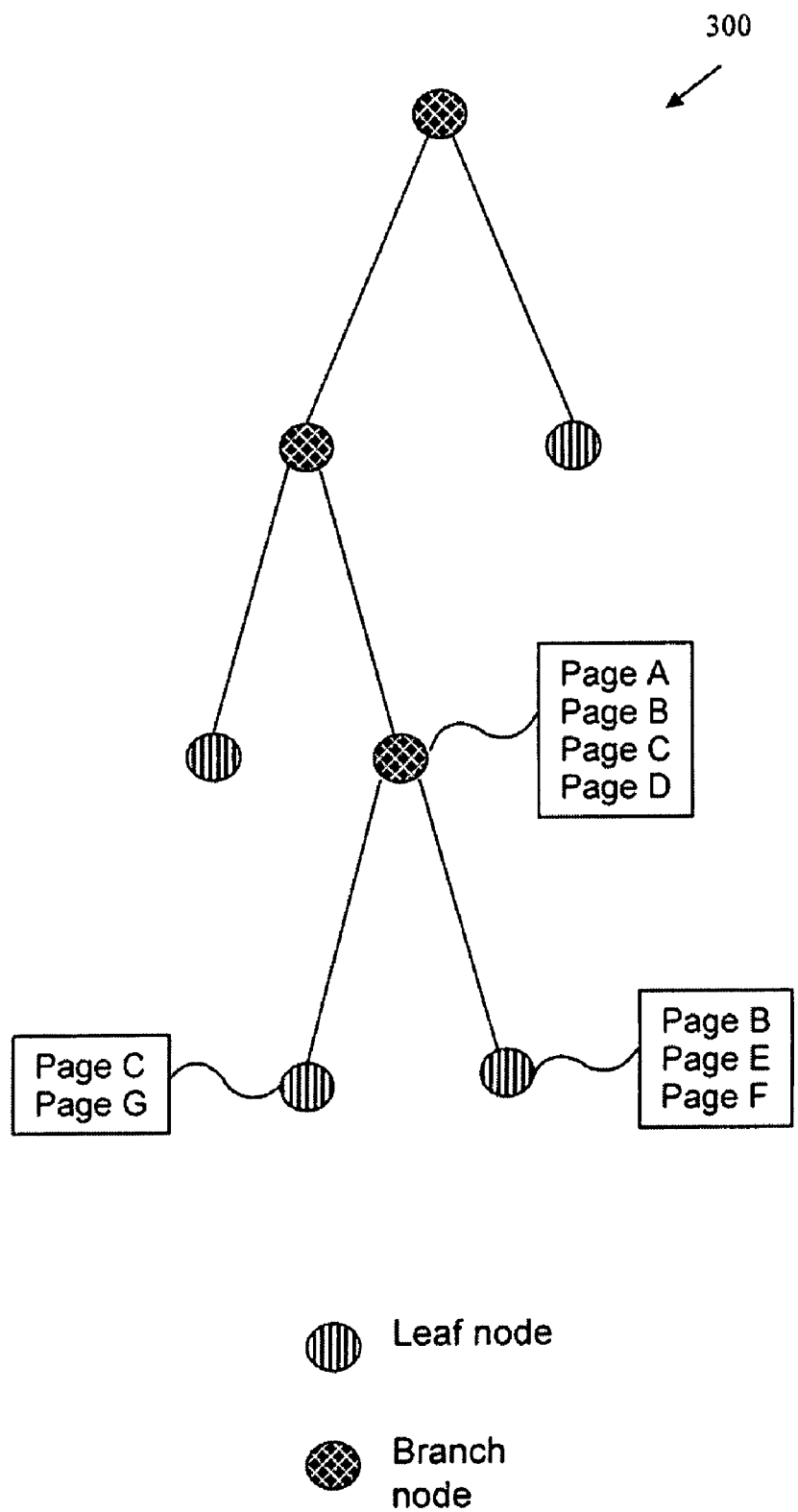
FIG. 3 illustrates a tree structure in accordance with some embodiments.

FIG. 1 illustrates a process 100 for providing advertising and/or targeting services. The process 100 begins at the step 104, where a finite set of topics is selected. Then, at the step 108, the selected topics are arranged. Preferably, the topics are arranged into a hierarchical directory and/or tree structure. FIG. 3 illustrates a tree structure 300 in accordance with some embodiments of the invention. As shown in FIG. 3, the tree 300 includes branch nodes 302 and leaf nodes 304 and 306. As illustrated, the leaf nodes 304 and 306 are associated as a sub level of the branch node 302. Typically the leaf nodes are finer grained sub sets of the category, directory, and/or topic of the branch node 302. The tree structure 300 is later discussed in further detail.

Returning to FIG. 1, at the step 112, relevant impression items are classified into the nodes within the tree. The impression items include keywords, web sites, pages, and/or publisher inventory for the placement of advertising, with which users interact such as, for example, by searching, browsing, viewing, clicking, and the like.

At the step 116, bidding is allowed directly against the nodes within the tree structure. Advertisers preferably bid on leaf topics and/or branch topics. For instance, bidding on leaf topics is an offer to purchase ad space on pages content-matched or associated to that leaf node. Bidding on branch topics is an offer toward all the impression items and/or pages associated with the leaf nodes below the branch node. Preferably, a bid is accompanied by a budget and a time period. For those bids not accompanied by a budget or a time period, some embodiments provide a default budget and/or a default time period. A winning bid by an advertiser in one of the leaves entitles the advertiser to run ads on sites that are matched to the topic. As mentioned, the sites preferably contain inventory for the presentation of advertising and are preferably matched to the topic, for example, by using content matching.

Requests for Refinement and/or Node Splitting

Figure 2:
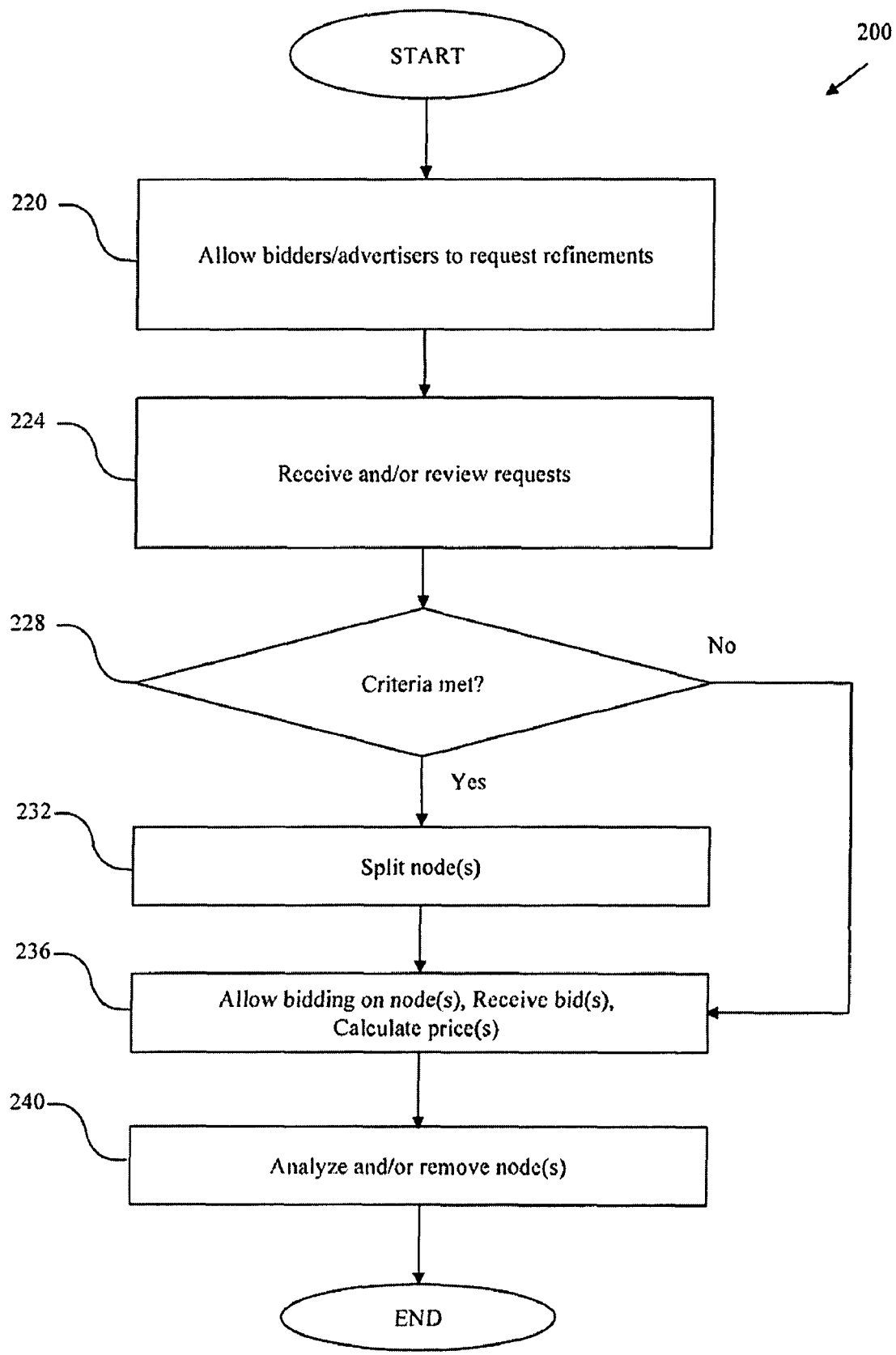
FIG. 2 illustrates a process for refinement according to some embodiments.

As mentioned previously, advertisers tend to prefer advertising services and/or products that are more finely tuned and/or customizable to their needs. Hence, some embodiments provide to the bidders and/or advertisers of the marketplace generated by the process 100 of FIG. 1, additional functionality for requesting refinements of the product offerings and/or nodes within the marketplace system. Accordingly, FIG. 2 illustrates a process 200 for refinement of some embodiments. As shown in this figure, the process 200 begins at the step 220, where bidders/advertisers are provided an opportunity to request a leaf node to be split or sub divided to meet their advertising product needs. This is especially useful to advertisers who do not initially find a desirable level of granularity to bid on advertising products initially offered in the marketplace system that was generated, for example, as described above in relation to FIG. 1.

At the step 224, requests for a refinement are received and reviewed editorially. Such a request includes, for example, splitting a node within the generated marketplace tree structure thereby forming a branch node having sub-nodes that include a more specific category or topic for classifying topic items. However, not all requests to split a node have relevance and/or value. Hence, some embodiments apply a set of rules for determining the relevance and/or value of the refinements requested by bidders and/or advertisers, before accepting the requested refinement (e.g., before node splitting). Moreover, advertisers must meet the reserve price/premium bid before a node is split. Once a prospective refinement is accepted, traffic available against the refinement and/or split node will be directed to that advertiser. If no such traffic exists, the advertiser and system do not gain anything by the split. Accordingly, the mechanism or pricing premiums, editorial review, and checking available supply protects against irrelevant splits.

Figure 4:
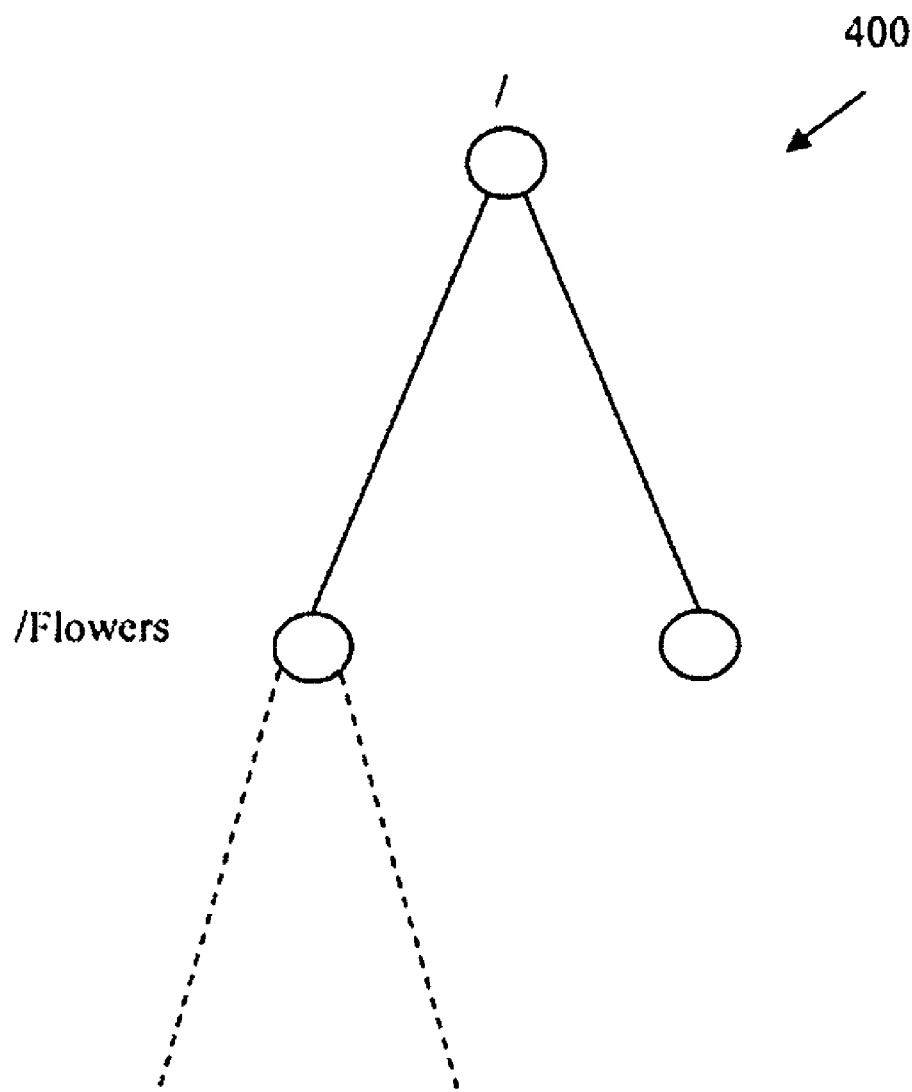
FIGS. 4, 5, and 6 illustrate the node division of some embodiments.
Figure 5:
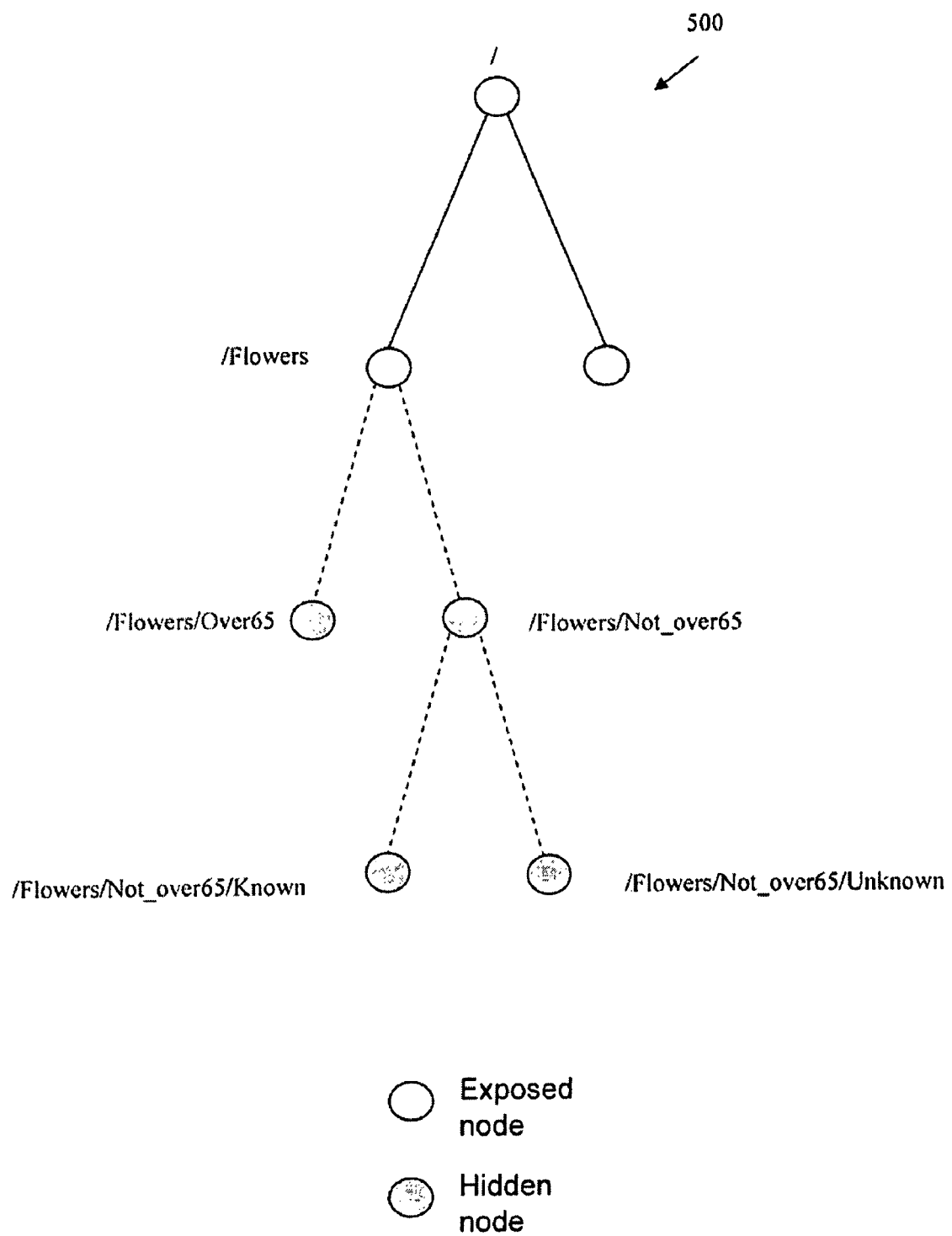
Figure 6:
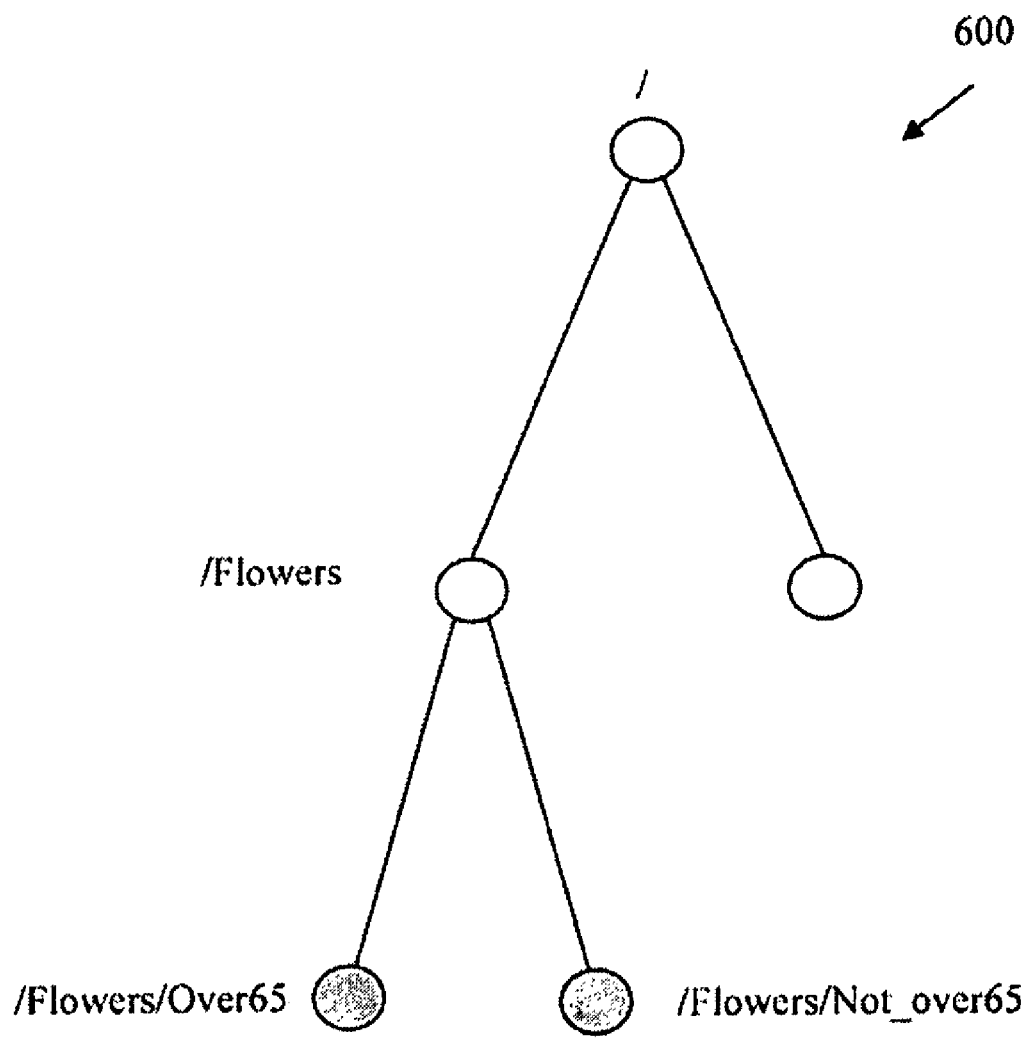

In view of the foregoing, a determination is made at the step 228 whether certain criteria are met such as the criteria described above. If the necessary criteria are met at the step 228, then the process 200 transitions to the step 232, where one or more nodes are split. FIGS. 4 through 6 illustrate an example of a leaf node being split thereby forming a branch node and two sub nodes, that are sub categories and/or sub topics of the branch node.

After the step 232, the process 200 transitions to the step 236, where advertiser's are allowed to bid against the nodes within the tree structure, including any new nodes created by node splitting. Once bids against nodes are received, an equilibrium price is computed. Preferably, the equilibrium price is calculated for each node. If, at the step 228, the criteria are not met, then the process 200 transitions directly to the step 236, without splitting nodes.

Then, the process 200 transitions to the step 240, where one or more nodes are analyzed for performance metrics. At the step 240, one or more nodes may be identified and/or selected for removal based on its performance. For instance, in one embodiment the survival of split nodes is determined by the state of a parent node in relation to its child node(s). The child node(s) may include a recently split node. In this embodiment, if prices on the parent node are higher than the price of the split node after the node splitting, then the split is preferably sustained. Conversely, if the price of the parent node is lower as a result of the split, then the split is preferably removed. Moreover, equilibrium pricing for the individual nodes of the tree structure is recalculated after nodes are split, and/or after split nodes are removed such that the tree structure remains in an equilibrium and/or balanced state. After the step 240, the process 200 concludes.

In the exemplary embodiment described above, split nodes that are requested by one advertiser and that are approved and survive the process are made available to other advertisers for bidding. Further, only topics that demonstrate a threshold level of participation are sustained within the taxonomy and/or tree structure for bidding. Advantageously, advertisers must bid a minimum premium price over the base leaf price to request a node split or division. The premium price of an exemplary embodiment may include, for instance, a bid price that is 20% over the base leaf price. Further advantageously, the bid premium is used as a control variable that may be adjusted to increase the amount of customization within the generated marketplace system. Lower price premiums, encourage more node divisions, while higher price premiums (for requesting divisions), discourage excessive node divisions and/or overly fine advertising product segmentation. Moreover, at least initially the proposals for divisions are optionally reviewed by editorial staff to insure rational divisions.

Further, a proposal for product segmentation and/or division survives if it attracts sufficient competition and if it is economically significant within the marketplace system. Hence, market forces are advantageously employed to optimize the set of advertising products that are offered to the bidders and/or consumers of such products.

FIGS. 4 through 6 illustrate an example of bidding and request for node division, according to some embodiments. In this example, a bidder submits a bid on the node /Flowers crossed with the demographic targeting criteria of "over 65 years old". As shown in FIG. 4, a tree 400 includes a top or root level branch node (e.g., "/") and a node for /Flowers, but does not provide for the demographic sub topic, category, and/or item of /Flowers/Over_65. However, as indicated by the dashed lines, the bidder may propose and/or request division of the node /Flowers into sub nodes. The request for division preferably costs the bidder a minimum premium (e.g., 20%, in this example) more than the going price for purchasing advertising at the node /Flowers. If the price premium and/or other criteria are met, the complementary categories (i.e., sub nodes) then are tentatively created by an editorial process and open for bidding. Note that "over 65" has two complements: "known to be less than 65" and "not known." These are illustrated as the hidden nodes of FIG. 5, along with the proposed complementary nodes /Flowers/Over65 and /Flowers/Not_over65.

However, as shown in FIG. 6, the editorial process has approved and implemented only the nodes /Flowers/Over65 and /Flowers/Not_over65 into the tree 600. If the three categories (i.e., /Flowers, /Flowers/Over65, and /Flowers/Not_over65) attract some minimum volume of bids such as, for example, 20% of the node volume, or some minimum dollar amount, or both, the split is approved and is incorporated into the set of nodes within the tree structure. As long as the nodes maintain a minimum level of performance within the system, then the nodes are not removed. Similarly, nodes including child nodes from a split, are preferably retired and/or removed when the node(s) fail to sustain a volume of commerce. Once the volume of commerce criterion is met, some embodiments do not enforce the 20% premium. If targeting requires additional sensing costs, some embodiments apply a surcharge to all divisions which could be a different level (e.g., 5% per division cumulative over all divisions). By dividing markets by their targeting, this mechanism permits bidding on a variety of targeting divisions, while accommodating a simple marketplace system.

Two leaf nodes may actually refer to the same content and/or pages. For instance, the node /Travel/Books and the node /Books/Travel include all the same pages and/or keywords. Some implementations detect these duplicitous nodes automatically by comparison of the pages that match the two nodes. If the same set of pages substantially matches both nodes, the two nodes are advantageously collapsed into a single node. To detect these cases, some embodiments employ a graph rather than a tree structure.

Demand Allocation and Pricing

As mentioned above, embodiments of the invention form a market system for determining optimal pricing for placing advertising at each node in the system. To generate the market system, some embodiments employ the processes 100 and/or 200 described above in relation to FIGS. 1 and 2. Preferably, the optimal pricing is determined by using the demand for each node. Accordingly, the demand allocation and pricing of some embodiments is described in further detail. Generally, the demand at each leaf node comprises (1) direct demand expressed at the leaf node, and (2) demand inherited from branch nodes, i.e., the parent node(s) of each leaf node. Branch node demand is allocated to leaf nodes either by the relative price of leaf nodes, or by the relative volume of leaf nodes. Once the demand for each node is allocated and/or determined, bids and/or equilibrium pricing are computed as a result of an allocation scheme. The equilibrium price at each node in the generated marketplace system advantageously determines prices for the selection, placement, and/or presentation of advertising.

Demand Allocation Schemes

When an advertiser places a bid at a branch node that has two or more sub-nodes (i.e., branch and/or leaf nodes), possible allocation schemes include (a) a cheapest-traffic allocation scheme, (b) a cheap-preferred allocation scheme, (c) a balanced-traffic allocation scheme, and/or (d) a proportional-spend allocation scheme.

Figure 7:
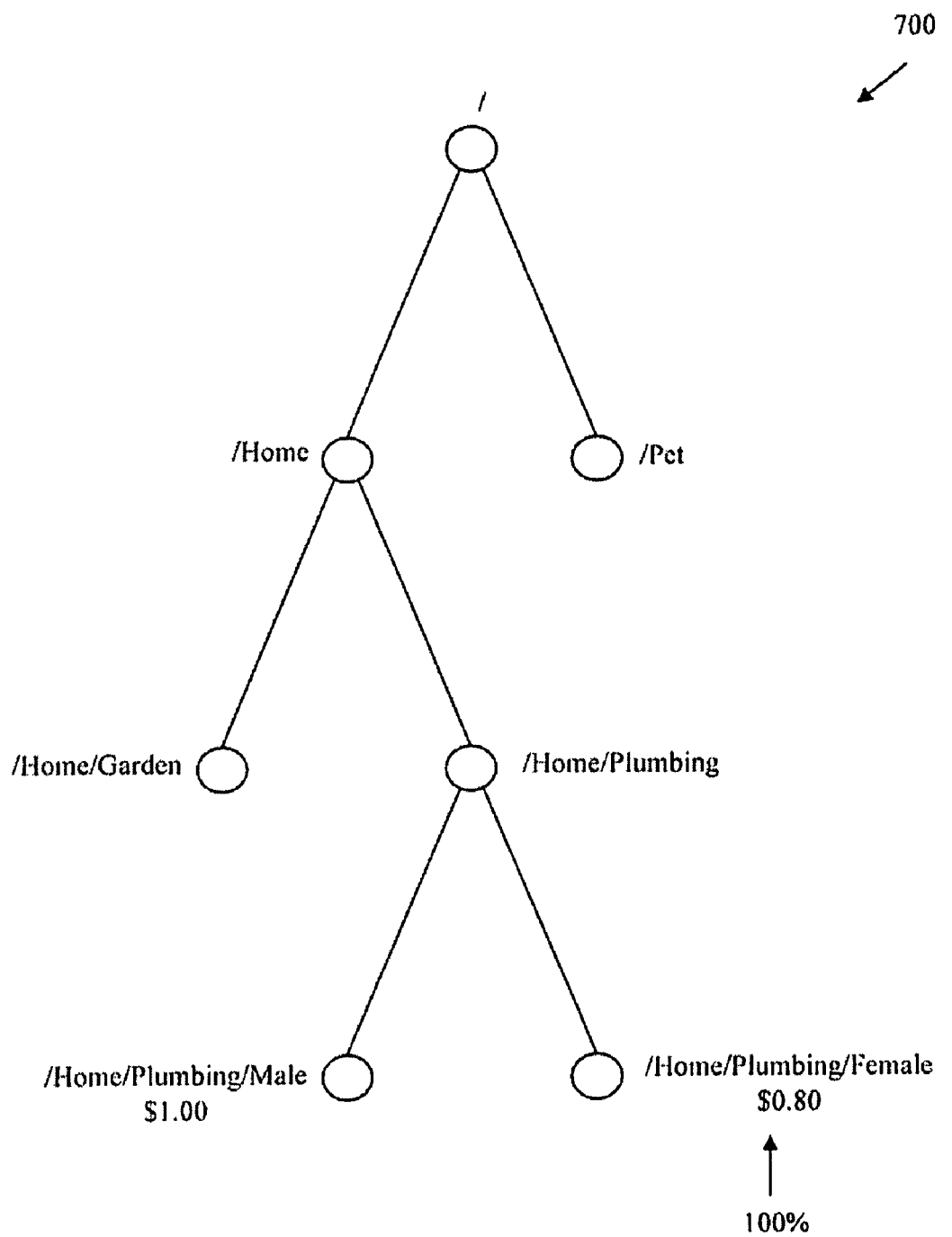
FIG. 7 illustrates an example of a cheapest-traffic allocation scheme.

The cheapest-traffic allocation scheme designates that the advertiser regards all traffic from a node as having the same value and there is no reason to pay more, such as for another node, unless the traffic from the cheapest node is depleted. FIG. 7 illustrates an example of a cheapest-traffic allocation scheme. In this example 700, the node /Home/Plumbing/Male has an advertising cost of $1.00, while the node /Home/Plumbing/Female has an advertising cost of $0.80. For purposes of discussion, the examples herein refer to a general implementation of advertising cost that uses cost per impression. One of ordinary skill, however, recognizes that the advertising cost is for a variety of advertising types in different implementations such as, for example, cost per impression (CPM), cost per click (CPC), and/or cost per acquisition (CPA). As shown in FIG. 7, the cheapest-traffic allocation scheme directs all (100%) of the advertiser's budget to the node having the cheapest advertising cost, which in this case is the node /Home/Plumbing/Female with a cost per impression of $0.80, until the volume at that node is exhausted. This is the case, in the cheapest-traffic allocation scheme, even though the complementary node (in this case, /Home/Plumbing/Male) may have a higher volume of traffic.

Figure 8:
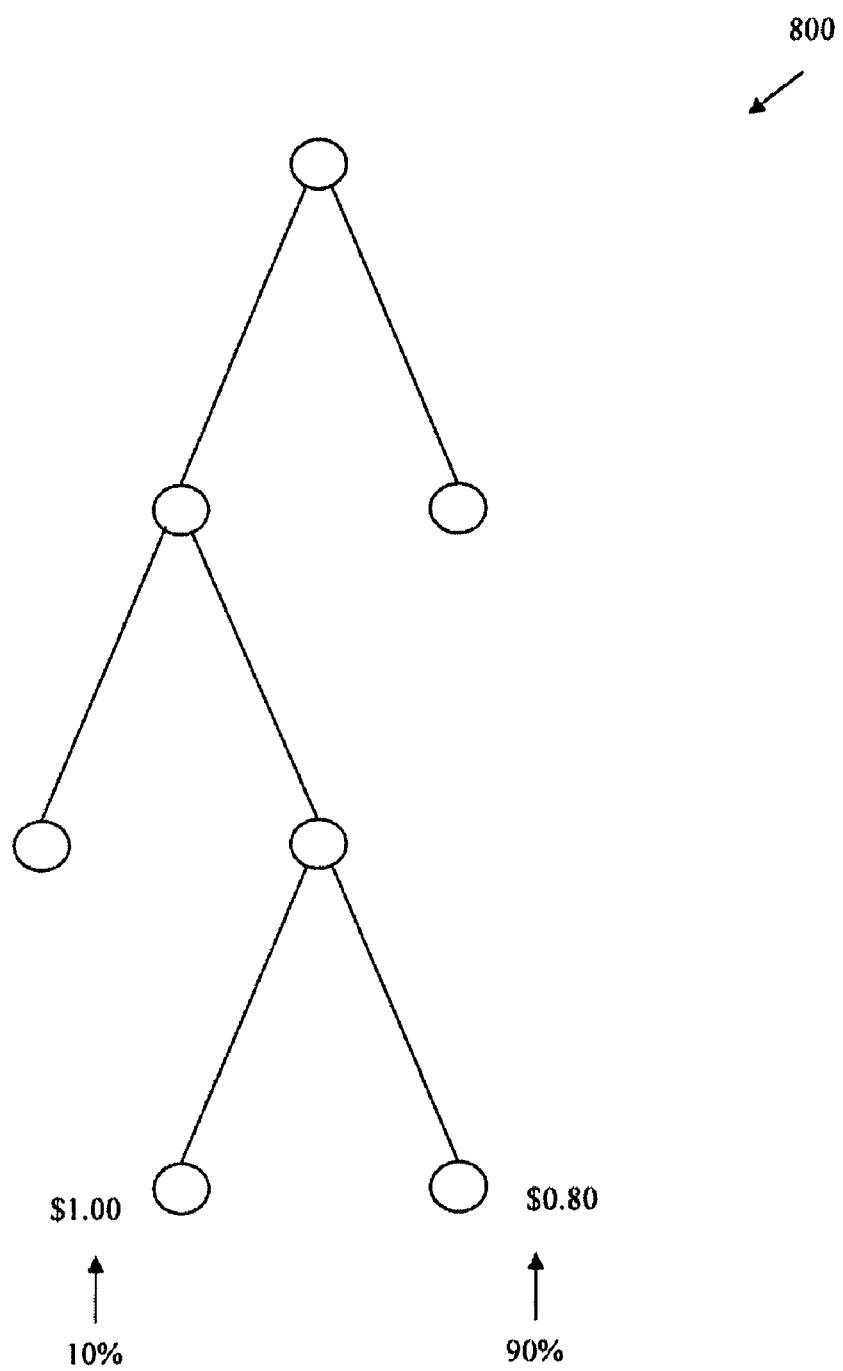
FIG. 8 illustrates an example of a cheap-preferred allocation scheme.

The cheap-preferred allocation scheme prefers sources that have lower pricing but tolerates some more expensive nodes. The cheap-preferred allocation scheme prefers value over simple price, while maintaining exposure to some other source nodes that may have slightly higher pricing. FIG. 8 illustrates an example 800 of a cheap-preferred allocation scheme. As shown in FIG. 8, 90% of the advertiser's budget is directed to the lower cost node. However, 10% of the advertiser's budget is also selectively directed to the higher cost node. Some embodiments employ a weighting mechanism to adjust the amount of budget directed to each node in the cheap-preferred allocation scheme. Some of these embodiments employ a variable weight mechanism to increase or reduce the amount of budget that is directed to each node.

Figure 9:
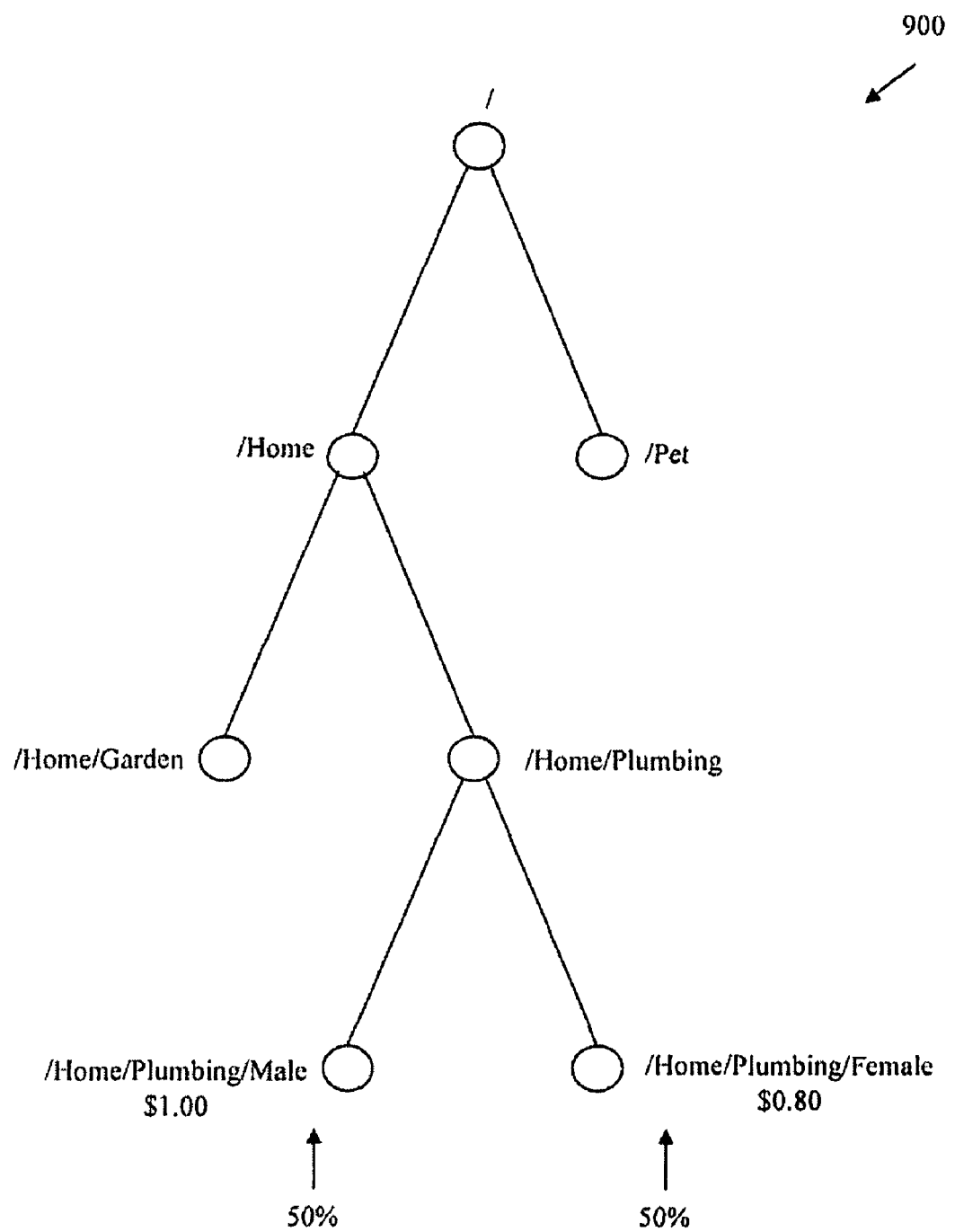
FIG. 9 illustrates an example of a balanced-traffic allocation scheme.

The balanced-traffic allocation scheme balances an advertiser's budget over a selected set of nodes regardless of the prices at each node. FIG. 9 illustrates an example 900 of the balanced-traffic allocation scheme within a particular tree structure 900. As shown in this figure, the tree structure 900 includes a branch node for items classified for /Home. This branch node includes two sub-nodes for /Home/Garden and /Home/Plumbing. The /Home/Plumbing node is itself a branch node that has two leaf nodes: /Home/Plumbing/Male, and /Home/Plumbing/Female. In the balanced-traffic allocation scheme, if the male and female leaf nodes have roughly the same volume, the same amount of traffic is delivered to the advertiser from both the /Home/Plumbing/Male and /Home/Plumbing/Female nodes, even if one node is more expensive than the other. In the illustrated implementation, each of the two nodes has an allocation of 50%.

Figure 10:
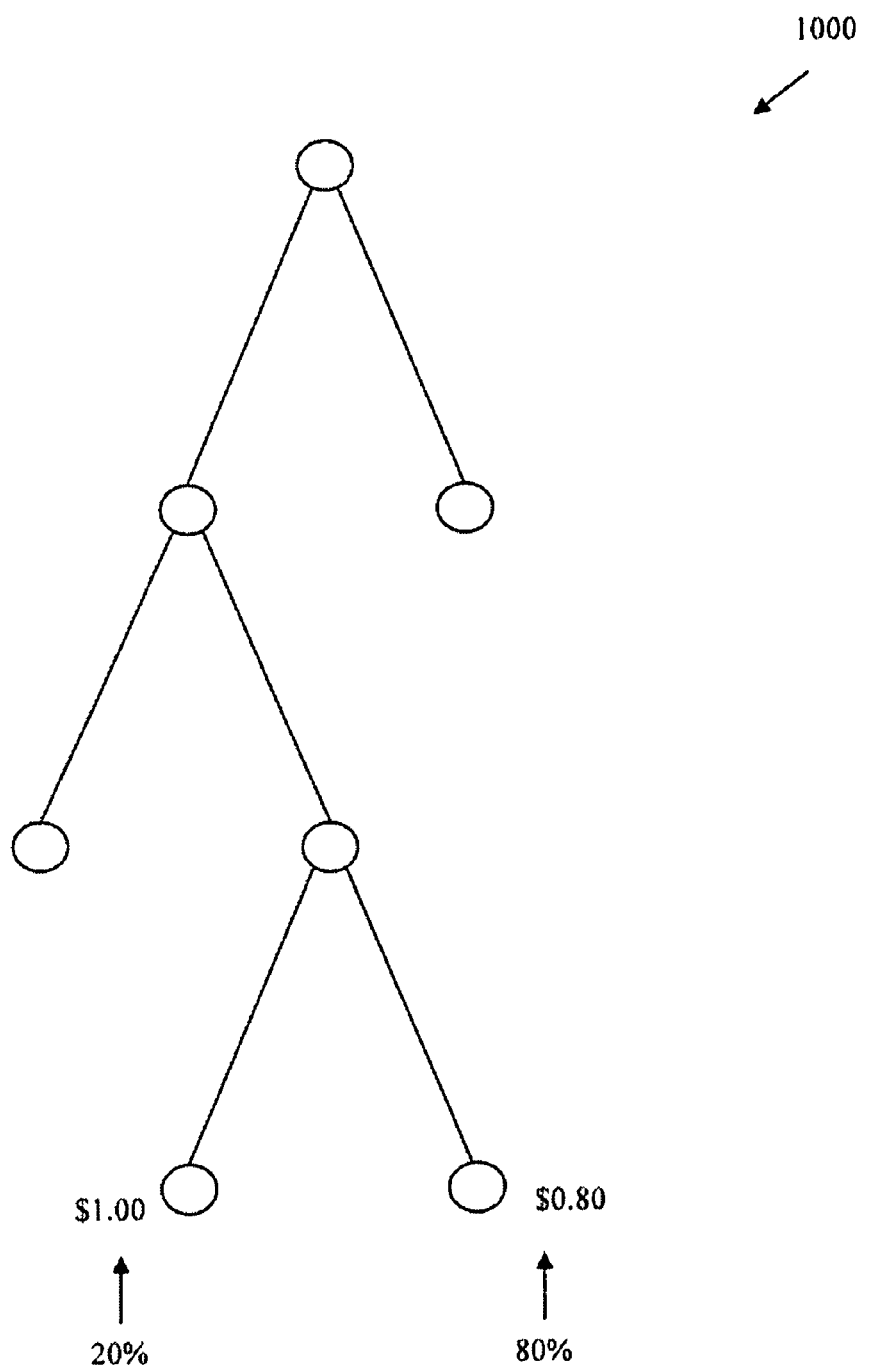
FIG. 10 illustrates an example of a proportional-spend allocation scheme.

The proportional-spend allocation scheme spends an advertiser's budget in proportion to the volume of traffic at different nodes. This is a special case as it offers a simple way of computing the equilibrium price at each node, as described below. FIG. 10 illustrates an example 1000 of the proportional-spend allocation scheme. As shown in this figure, two complementary leaf nodes of a branch node have advertising costs (e.g., CPM) of $1.00 and $0.80, respectively, and further have 20% and 80% of the traffic volume, respectively. Accordingly, the proportional-spend allocation scheme allots 20% of the advertiser's budget to the node costing $1.00 and having 20% of the traffic volume, and directs 80% of the advertiser's budget toward the node costing $0.80 and having 80% of the traffic volume.

Demand Allocation Model Examples

The foregoing is optionally expressed mathematically by way of example. In an exemplary embodiment, an advertiser submits a bid "b" at a branch node. Typically, there are leaf nodes below the branch node. The leaf nodes are indexed by i=1, . . . m, and have tentative market prices of $p_i$ for each node. Some embodiments construct a demand allocation function at each leaf node for the advertiser based on different assumptions about the advertiser's intentions. In a particular implementation, total spend for the leaf nodes is equal to the budget expressed by the advertiser for the branch node. The advertiser has a demand at a node only when the advertiser's bid is above the price of the node. The further notations below are used in the equations that follow:

$x_i$ represents the demand of an advertiser at the node i;
B is the budget expressed by the advertiser for all nodes below the branch node;
dt is the time interval under consideration;
T is the time period associated with the budget B; and
$V_i$ is the supply at node i for the time interval dt.

Demand Allocation Model1

In demand allocation Model1, demand is allocated based on price. Hence, in some embodiments, the demand allocation Model1 implements a cheapest-traffic demand allocation scheme, and/or a cheap-preferred demand allocation scheme. In the following expression of Model1, "I( )" is an indicator function, and "a" is a parameter that adjusts a balance of price-to-volume. Accordingly, as the parameter "a" becomes larger, the Model1 assigns all the demand to the lowest priced node, but for finite "a," the Model1 spreads the demand over the available products, and is continuous as well.

$$x_i = \frac{B}{p_i} \frac{dt}{T} \frac{p_i^{-a}}{\sum_{j=1}^{m} p_j^{-a} I(b > p_j)} I(b > p_i)$$

Further, this implementation of Model1 ensures a balanced budget, as indicated by:

$$\sum_{i=1}^{m} p_i x_i = B \frac{dt}{T}$$

Moreover, the relative demand at different nodes is proportional to the $-(a+1)$th power of relative price.

$$\frac{x_i}{x_j} = \frac{p_i^{-(a+1)}}{p_j^{-(a+1)}}$$

Demand Allocation Model 2

In Model2, the budgetary spend at each node is proportional to the traffic volume for the node. Hence, some embodiments of Model2 implement a proportional-spend allocation scheme.

$$x_i = \frac{B}{p_i} \frac{dt}{T} \frac{V_i}{\sum_{j=1}^{m} V_j I(b > p_j)} I(b > p_i)$$

Stated differently, the Model2 implies that:

$$\frac{p_i x_i}{p_j x_j} = \frac{V_i}{V_j}$$

Demand Allocation Model3

In Model3, the demand at each node is proportional to the traffic volume for the node. Hence, some embodiments of Model3 implement a balanced-traffic allocation scheme.

$$x_i = B \frac{dt}{T} \frac{V_i}{\sum_{j=1}^{m} p_j V_j I(b > p_j)} I(b > p_i)$$

Stated differently, the Demand Model3 implies that the demand by the advertiser at each node (e.g., node i, node j, etc.) is directly proportional to the traffic volume at the node, or:

$$\frac{x_i}{x_j} = \frac{V_i}{V_j}$$

Aggregate Demand

Some embodiments, given a set of equilibrium prices for each node, advantageously determine the total demand at one or more particular nodes. For instance, the foregoing is expressed as the total demand at the particular "node i."

$$\text{Total demand at node\_i} = \text{Total demand from advertisers bidding directly at node\_i} + \text{Total demand from advertisers bidding at branch nodes above node\_i}$$

The first term on the right hand side (RHS) of the equation, which is the total demand from advertisers bidding directly at node i, is preferably expressed as follows, where $j=1, \ldots, A$ is the set of all bidding advertisers:

$$\sum_{j=1}^{A} \frac{B_{ij}}{p_i} \frac{d\,t}{T} I(b_{ij} > p_i)$$

The second term on the right hand side (assuming allocation Model2), which is the total demand from advertisers bidding at branch nodes above the node i, is preferably expressed as:

$$\sum_{j=1}^{A} \frac{B_{kj}}{p_i} \frac{d\,t}{T} \frac{V_i I(b_{kj} > p_i)}{\sum_{m=\text{leaf nodes under node }k} V_m I(b_{kj} > p_m)}$$

For the case that (he node i is a "branch node" that is "above" node i, with no children nodes, then the total demand at node i is given by:

$$\text{demand}_i = \sum_{\substack{k=\text{branch nodes}\\ \text{above node }i}} \sum_{j=1}^{A} \frac{B_{kj}}{p_i} \frac{d\,t}{T} \frac{V_i I(b_{kj} > p_i)}{\sum_{m=\text{leaf nodes under node }k} V_m I(b_{kj} > p_m)}$$

Equilibrium Price

At equilibrium, the demand at the node i equals the supply at the node i, which in this notation is Vi. Hence, the supply at the node i, for all leaf nodes $i=1, \ldots, M$ in the tree structure, is given by:

$$V_i = \sum_{\substack{k=\text{branch nodes}\\ \text{above node }i}} \sum_{j=1}^{A} \frac{B_{kj}}{p_i} \frac{d\,t}{T} \frac{V_i I(b_{kj} > p_i)}{\sum_{m=\text{leaf nodes under node }k} V_m I(b_{kj} > p_m)}$$

In view of the foregoing, the price at the node_i, is given by:

$$p_i = \sum_{\substack{k=\text{branch nodes}\\ \text{above node }i}} \sum_{j=1}^{A} B_{kj} \frac{d\,t}{T} \frac{I(b_{kj} > p_i)}{\sum_{m=\text{leaf nodes under node }k} V_m I(b_{kj} > p_m)}$$

which is advantageously used to determine the equilibrium price for all nodes.

Matching Examples

Some implementations address a matching problem in relation to the pricing and/or demand allocation mechanisms described above. For instance, matching is relevant to capturing demand for a set of topics, and classifying impression items such as pages of content, for example, into these topics by using the taxonomy generation and/or expansion described above. More specifically, some implementations match a particular pageview to a node in the tree structure. Further, some of these implementations determine which of the advertisers that bid on the node in the tree structure should be served. As described above, the set of marketable products within the generated taxonomy (e.g., the directory tree structure) is fluid and evolving as nodes are added and/or removed, for example. In contrast, traditional "content match" connects advertisers and content providers without invoking market forces to set price, in a way that doesn't scale well as audiences are refined.

In some cases, the matching problem is divided into two components, (1) cross-product matching, and (2) intra-product matching, For cross-product matching, given a particular pageview p, implementations of the invention advantageously calculate an eligibility of a price "p" to a product and/or node i. This is expressed symbolically as P(i|p). For intra-product matching, given a product and/or node i, some implementations calculate the relevance of listing an advertiser advertisement "x" to the product and/or node i, which is expressed symbolically as QS(x|i).

Under these formulations, two alternatives are available for selection. Accordingly, some embodiments choose a best eligible demand across all the nodes i within the taxonomic or classification structure (i.e., across all the available products). These embodiments rank by using a combination of the matching schemes given by: P(i|p)*QS(x|i)*bid(x|i). In some cases, the intra-product matching expression QS(x|i) is replaced with a parameter alpha, and/or the expression P(i|p) is replaced with a parameter beta. Alternatively, the combination QS*P is represented by a parameter gamma.

Some embodiments advantageously randomly select a node i by using the expression P(i|p), then choose a best eligible advertisement for the selected node i by using the expression QS(x|i)*bid(x|i).

Additional Features and Advantages

Coarse Targeting and Auction Pricing

In the tree structure, a bid may be placed at a leaf node (e.g. /Automotive/Military Vehicles), and may also be placed at a branch node (e.g. /Automotive). A bid at a branch node preferably indicates that the bidder values each leaf node equally. Bidders who have substantial variation in values across leaves have the option of more detailed bidding to indicate their differences in node valuation. Accordingly, the system advantageously computes equilibrium prices by apportioning demand from high-level bids to the cheapest sub-node. Some embodiments use one or more demand models to apportion demand at each node. Exemplary demand models and variants were described above. The price at each node is advantageously calculated by using a formula, also described above. Within the system, all goods are substitutes, and demand-to-price convergence is guaranteed, even at various levels of demand.

The system of a particular embodiment accepts prices in effective cost per impression (eCPM), in cost per acquisition (CPA), and/or units of cost per conversion (CPC). However, the system preferably normalizes the various units into effective cost per impression (eCPM). Hence, an advertiser who bids based on cost per acquisition shown on a site is charged based on a more uniform pricing of effective cost per impression. The effective cost per impression is the market clearing price divided by the (squashed) estimated action probability or response prediction.

Bids based on cost per conversion are similarly converted to effective cost per impression by multiplying the bid amount by a click prediction rate. As mentioned, winning bids are preferably determined by converting all units to effective cost per impression (eCPM).

Bidding and Additional Information for Bidders

Some implementations permit, in addition to bids at nodes, a maximum value bid for the advertiser. In a maximum value bid, a variety of bid prices are submitted on nodes and leaves, and the system spends the budget to maximize the advertiser's profit under the hypothesis that the bid prices were actual values for the advertiser's spend at the node(s). Note that a node bid is just a maximum value bid with a uniform price over all the leaves under that node. Alternatively, some implementations allow the advertiser/user to specify the value of the parameter "a," and/or to specify different amounts for the sub nodes of a branch node.

The bidding and/or market systems described herein are complex for bidders because the bidders do not know what they are buying. Advantageously, content match technology is used to provide information to bidders, in particular providing, for example, the top ten or top 50 pages which match the terms as an information provision device, or providing the top, pages which are different from each other. Thus, if a bidder queries to ask what the difference is between two leaf nodes, the system preferably returns pages that are related to the first node but not to the second node, and vice versa.

Initially, the marketplace system generated by embodiments of the invention is designed to start in a simple state and evolve as necessary. That is, the initial set of products is generally simple, and bidders request the generation of new products and/or nodes, as described. If the value for the new topics is present, the system preferably generates new product offerings and/or nodes for the new topics and sub topics. Such marketplace offerings start by bidders paying a premium to split and/or divide. Advantageously, as the generated submarkets become thicker the premium becomes endogenous and set by market forces. Further, using the marketplace system of some embodiments reduces the likelihood of error from the matching of advertisers to topics. Advertisers see what they are buying and can control what they are buying as a larger marketplace system is generated. Using performance-based pricing and the generated marketplace system more effectively matches advertisers to appropriate advertising and/or purchasing opportunities. Moreover, embodiments of the invention begin with default configurations for ad formats and/or page locations. However, some implementations preferably permit bidders to deviate from the default configurations, for example, by specifying particular size advertisements. These requests for customization are often implemented by using some of the targeting refinements described above.

System

Figure 11:
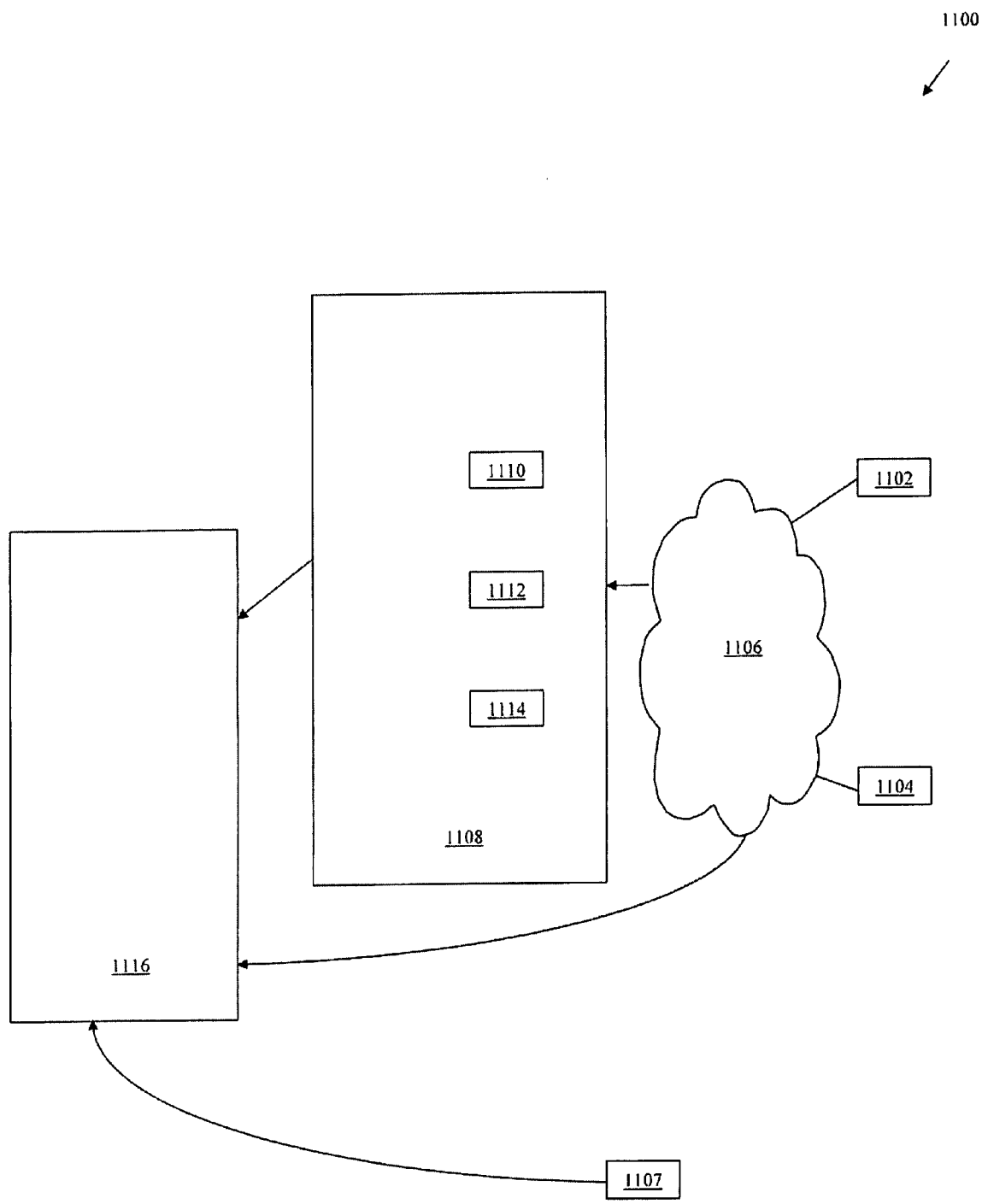
FIG. 11 illustrates a system according to some embodiments of the invention.

FIG. 11 illustrates a system 1100 that presents advertising to users through a network. As shown in this figure, the system 1100 includes a plurality of users 1102 and 1104 that interact with a network 1106. The network includes local area networks, wide area networks, and networks of networks such as the Internet, for example. The network 1106 typically includes several sites comprising a number of web pages having content and inventory. The ad inventory is for the presentation of advertising to the users 1102 and 1104. Accordingly, the network 1106 is coupled to an exemplary site or page 1108 that includes several inventory placements 1110, 1112 and 1114. The site 1108 is coupled to a server 1116 for data collection and processing. The server 1116 receives data from a variety of sources, including directly from the users 1102 and 1104, from the network 1106, from the site 1108, and/or from another source 1107. Typically, the site 1108 is provided by a publisher, while the server 1116 is typically provided by an ad network. Further, as users 1102 and 1104 interact with the network 1106, and the site 1108, advertisements placed in the inventory of the site 1108, are presented to the users 1102 and 1104.

The selection and/or presentation of advertising through the inventory is a non trivial process. The inventory is typically distributed across many varied sites, zones, domains and pages. There are many different users and types of users, and marketers, advertisements, and ad campaigns are usually numerous and varied as well. Timely, relevant, appropriate and/or coherent matching and delivery of content such as advertising is a problem that can have millions of input data points, or more.

Figure 12:
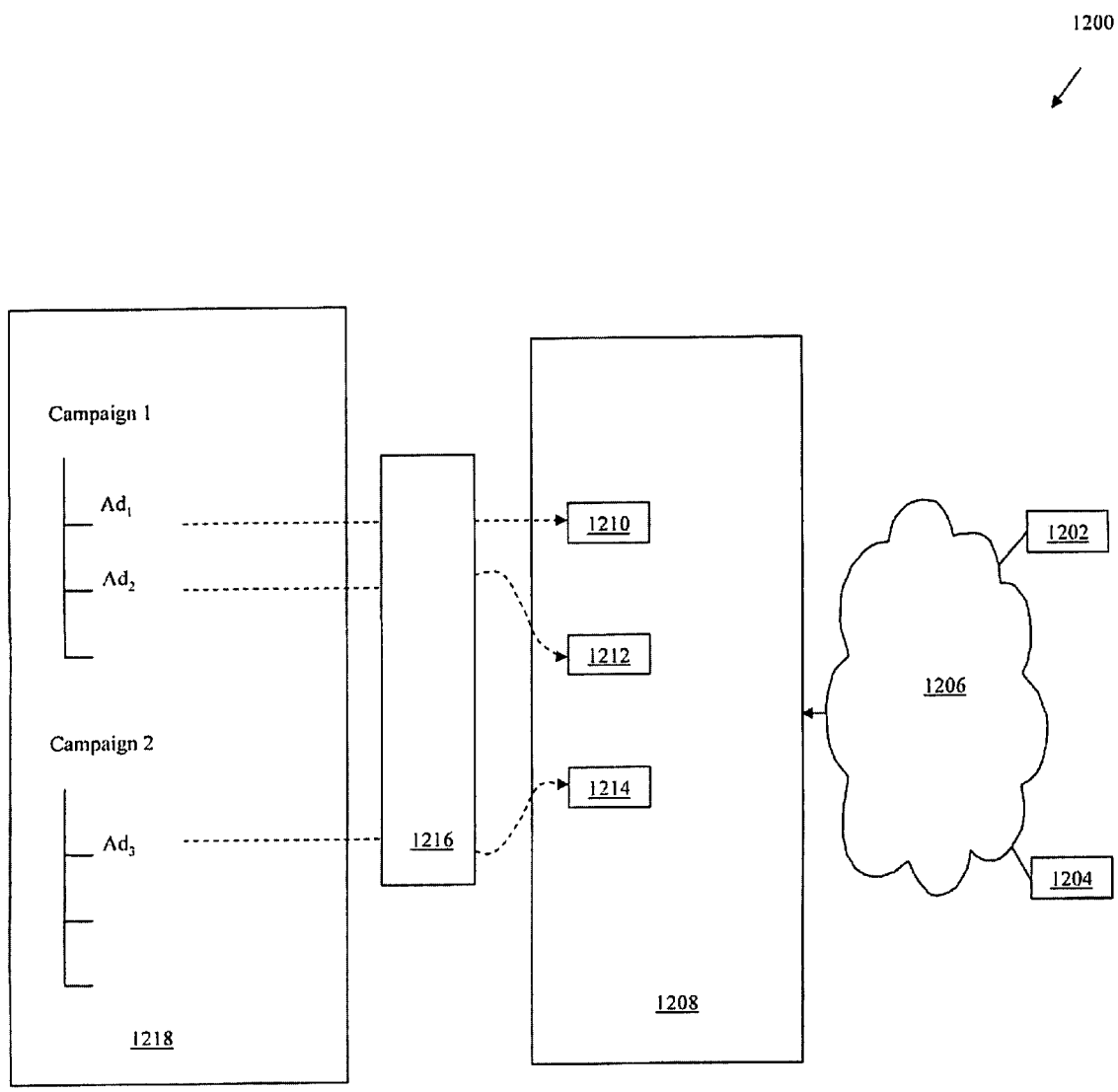
FIG. 12 illustrates a system in accordance with some embodiments.

Hence, FIG. 12 illustrates a system 1200 for the intelligent selection of advertising for the site 1208, and the presentation of the selected advertisements to the users 1202 and 1204 through a network 1206. As shown in this figure, the system 1200, includes a server 1216 coupled to the site 1208, and a marketer 1218 that provides information to the server 1216. The marketer 1218 generally has one or more ad campaigns that have one or more advertisements. A campaign and advertisements within the campaign are designed to promote an activity toward conversion by the user such as, for example, to generate a user impression, to generate a click, a lead, and/or an acquisition. Accordingly, the server 1216 selects and/or places the advertisements from the various campaigns of the marketer 1218 with the inventory 1210, 1212, and 1214, of the site 1208. Preferably, the selection is based on a variety of data that is collected and/or received by the server 1216. The data includes user data, publisher data, and/or marketer data that is compiled, processed, and stored in certain advantageous ways such as by using the generated marketplace system described above.

While the invention has been described with reference to numerous specific details, one of ordinary skill in the art will recognize that the invention can be embodied in other specific forms without departing from the spirit of the invention. For instance, the examples given above often relate to online media. However, targeting across a multiple of media types is applicable as well. Thus, one of ordinary skill in the art would understand that the invention is not to be limited by the foregoing illustrative details, but rather is to be defined by the appended claims.

What is claimed is:

1. A computer-implemented method of categorizing advertising for advertisers within a network, the method comprising: arranging, using a computer server, a plurality of topics as nodes in a hierarchical structure; classifying, using a computer server, impression items into the topics corresponding to the nodes within the hierarchical structure; allowing, using a computer server, bidding for the impression items within the hierarchical structure; receiving, at a computer server from within the network, a request from a bidder for creating a second provisional leaf node and a third provisional leaf node from a first permanent node in the hierarchical structure, wherein the second provisional leaf node and the third provisional leaf node correspond to sub-topics of the first permanent node's corresponding topic; upon determining, using a computer server, that the bidder has met a threshold minimum bid for the first permanent node, creating, using a computer, the second provisional leaf node and the third provisional leaf node, wherein the first permanent node is a parent node of the second provisional leaf node and the third provisional leaf node; allowing, using a computer server, bidding against the first permanent node, the second provisional leaf node, and the third provisional leaf node within the hierarchical structure; upon determining, using a computer server, that bids on the first permanent node are higher as a result of creating the second provisional leaf node and the third provisional leaf node, converting, using a computer, the second provisional leaf node and the third provisional leaf node into a first permanent leaf node and a second permanent leaf node, respectively, within the hierarchical structure, wherein the first permanent leaf node and the second permanent leaf node are made available to other advertisers for bidding; and upon determining, using a computer server, that the bids on the first node are lower as a result of creating the second provisional leaf node and the third provisional leaf node, removing the second provisional leaf node and the third provisional leaf node from the hierarchical structure.

2. The computer implemented method of claim 1, further comprising: receiving a plurality of bids for the first permanent node within the hierarchical structure; and calculating an equilibrium price for the first permanent node, the bids for purchasing the right to present content in relation to a node.

3. The method of claim 1, wherein impression items classified into a node comprise keywords, web sites, pages, or publisher inventory for the placement of advertising.

4. The method of claim 1, wherein equilibrium pricing for the nodes within the hierarchical structure are calculated after nodes are divided or removed.

5. A system for providing advertising services, the system comprising a server for: arranging a plurality of topics as nodes in a hierarchical structure; classifying impression items into the topics corresponding to the nodes within the hierarchical structure; allowing bidding for the impression items within the hierarchical structure; receiving a request from a bidder for creating a second provisional leaf node and a third provisional leaf node from a first permanent node in the hierarchical structure, wherein the second provisional leaf node and the third provisional leaf node correspond to subtopics of the first permanent node's corresponding topic; upon determining that the bidder has met a threshold minimum bid for the first permanent node, creating, using a computer, the second provisional leaf node and the third provisional leaf node, wherein the first permanent node is a parent node of the second provisional leaf node and the third provisional leaf node; allowing bidding against the first permanent node, the second provisional leaf node, and the third provisional leaf node within the hierarchical structure; upon determining that bids on the first permanent node are higher as a result of creating the second provisional leaf node and the third provisional leaf node, converting, using a computer, the second provisional leaf node and the third provisional leaf node into a first permanent leaf node and a second permanent leaf node, respectively, within the hierarchical structure, wherein the first permanent leaf node and the second permanent leaf node are made available to other advertisers for bidding; and upon determining that the bids on the first node are lower as a result of creating the second provisional leaf node and the third provisional leaf node, removing the second provisional leaf node and the third provisional leaf node from the hierarchical structure.

6. The system of claim 5, wherein the server is further for: receiving a plurality of bids for the first permanent node within the hierarchical structure; and calculating an equilibrium price for the first permanent node, the bids for purchasing the right to present content in relation to a node.

7. The system of claim 5, wherein impression items classified into a node comprise keywords, web sites, pages, or publisher inventory for the placement of advertising.

8. The system of claim 5, wherein equilibrium pricing for the nodes within the hierarchical structure are calculated after nodes are divided or removed.

* * * * *